US012570135B2

(12) United States Patent
Elkantati et al.

(10) Patent No.: US 12,570,135 B2
(45) Date of Patent: Mar. 10, 2026

(54) JOINT FOR SECURING COMPONENTS OF A VEHICLE

(71) Applicant: Rivian IP Holdings, LLC, Irvine, CA (US)

(72) Inventors: Sharbel Elkantati, Windsor (CA); Anna Katherine Lummus, Corona Del Mar, CA (US); Ryan Arens, Irvine, CA (US); Casey Taylor Dunn, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 297 days.

(21) Appl. No.: 18/534,535

(22) Filed: Dec. 8, 2023

(65) Prior Publication Data

US 2025/0187417 A1    Jun. 12, 2025

(51) Int. Cl.
*B60K 1/04* (2019.01)
*H01M 50/242* (2021.01)

(52) U.S. Cl.
CPC ............. *B60K 1/04* (2013.01); *H01M 50/242* (2021.01); *B60K 2001/0438* (2013.01)

(58) Field of Classification Search
CPC ............. B60K 1/04; B60K 2001/0438; H01M 50/242
See application file for complete search history.

(56) References Cited

U.S. PATENT DOCUMENTS

| | | | |
|---|---|---|---|
| 2019/0016231 A1* | 1/2019 | Scaringe | H01M 10/613 |
| 2022/0194197 A1* | 6/2022 | Park | H01M 50/249 |
| 2023/0163435 A1* | 5/2023 | Janers | H01M 50/204 |
| | | | 429/7 |
| 2024/0317038 A1* | 9/2024 | Ozawa | B62D 21/02 |

* cited by examiner

*Primary Examiner* — Edwin A Young
(74) *Attorney, Agent, or Firm* — BAKERHOSTETLER

(57) ABSTRACT
An apparatus may take the form of a skid plate designed to protect a vehicle, including a battery pack of the vehicle, from damage caused by obstructions or foreign objects. In order to secure the skid plate, several fasteners pass through respective openings of the skid plate. The skid plate includes one or more ribs surrounding each fastener opening. The ribs may engage a washer through which fasteners passes. When a torque is applied to a fastener to secure the skid plate, the fastener moves. The combination of the movement of the fastener the engagement of the washer by the ribs cause the washer to deform, or bend, and engage a compression limiter positioned in the opening. As a result, the fastener, the compression limiter, and the washer form a joint.

20 Claims, 16 Drawing Sheets

100

101

110   120   120   115   120   120   120   115

102

102

100

340

342

400

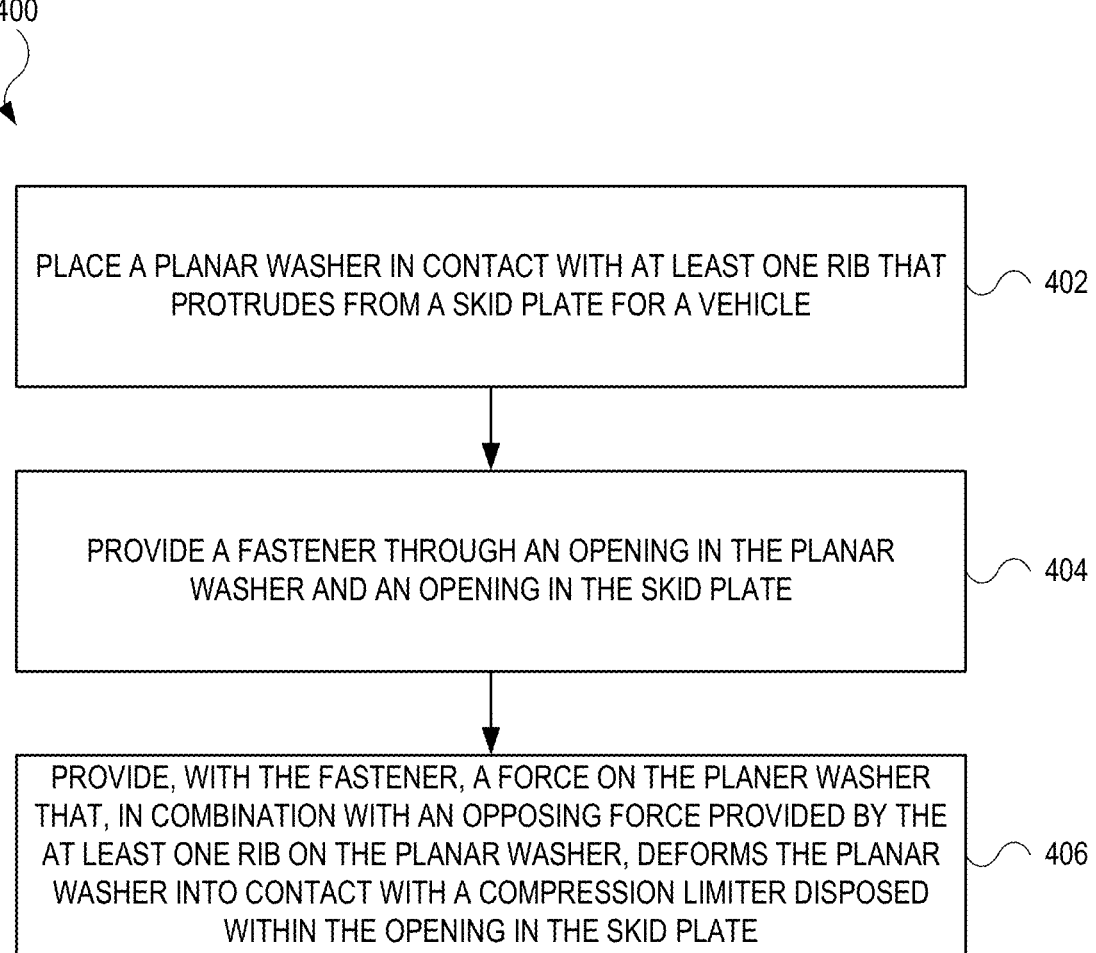

PLACE A PLANAR WASHER IN CONTACT WITH AT LEAST ONE RIB THAT PROTRUDES FROM A SKID PLATE FOR A VEHICLE — 402

PROVIDE A FASTENER THROUGH AN OPENING IN THE PLANAR WASHER AND AN OPENING IN THE SKID PLATE — 404

PROVIDE, WITH THE FASTENER, A FORCE ON THE PLANER WASHER THAT, IN COMBINATION WITH AN OPPOSING FORCE PROVIDED BY THE AT LEAST ONE RIB ON THE PLANAR WASHER, DEFORMS THE PLANAR WASHER INTO CONTACT WITH A COMPRESSION LIMITER DISPOSED WITHIN THE OPENING IN THE SKID PLATE — 406

FIG. 11

500
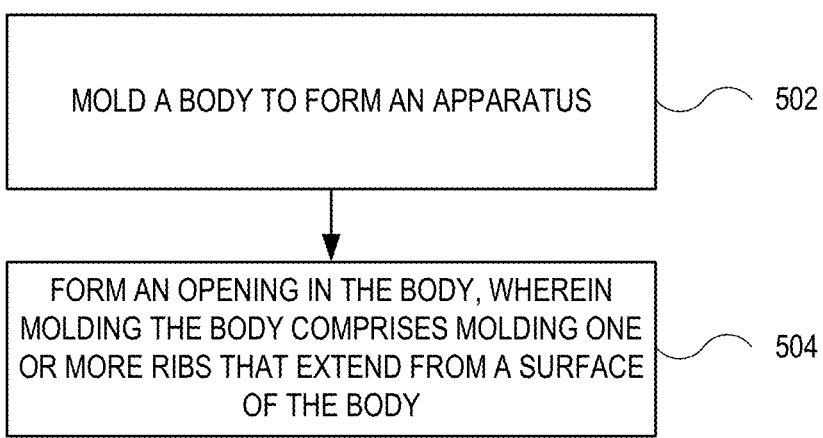
| MOLD A BODY TO FORM AN APPARATUS | 502 |
| FORM AN OPENING IN THE BODY, WHEREIN MOLDING THE BODY COMPRISES MOLDING ONE OR MORE RIBS THAT EXTEND FROM A SURFACE OF THE BODY | 504 |
FIG. 12

JOINT FOR SECURING COMPONENTS OF A VEHICLE

INTRODUCTION

Batteries are often used as a source of power, including as a source of power for electric vehicles that include wheels that are driven by an electric motor that receives power from the batteries. A battery may include several battery cells may be carried within a module and/or a carrier.

SUMMARY

The subject technology is directed to securing a skid plate in a vehicle. In particular, a joint between the skid plate and a battery pack enclosure may provide enhanced securing based on modifications to the skid plate. For example, the skid plate may include several ribs designed to engage a washer, with the ribs surrounding an opening formed in the skid plate. To secure the skid plate with a battery pack and/or a vehicle body, a fastener passes through the opening as well as through the washer. The torque applied to the fastener to secure the skid plate also causes the washer to deform and engage a compression limiter positioned in the opening of the skid plate. Further, the ribs provide a counterforce to the washer, causing the washer to undergo a two-dimensional bend.

According to one or more aspects of the present disclosure, an apparatus is described. The apparatus may include a body that includes an opening configured to receive a compression limiter. The apparatus may further include one or more ribs extending from a surface of the body, wherein the one or more ribs are configured to engage a washer, and cause, in part, the washer to bend and engage the compression limiter to form a joint configured to secure the body with a battery pack enclosure.

The body may include a skid plate, and the skid plate comprises a size and shape to cover a battery pack for a vehicle and to provide damage protection for a bottom surface of the battery pack. The one or more ribs may include a first rib and a second rib, and the opening may be positioned between the first rib and the second rib. The one or more ribs may extend a first distance from the surface, and the body may include a dimension such that the compression limiter extends beyond the surface to a second distance that may be less than the first distance. The compression limiter may include a steel ring, and the first distance may be 2 millimeters or less.

The one or more ribs may include a first rib and a second rib parallel with respect to the first rib. The compression limiter may be surrounded by the first rib and the second rib, and the first rib and the second rib may engage the washer. The body may include glass fibers embedded in a polypropylene.

According to one or more aspects of the present disclosure, an apparatus is described. The apparatus may include a skid plate configured to secure to a component of a vehicle. The skid plate may include a first surface, a second surface opposite the first surface, and an opening that extends from the first surface to the second surface. The skid plate may further include one or more ribs at least partially surrounding the opening and extending a first distance from the first surface. The opening may be configured to receive a compression limiter that extends beyond the first surface to a second distance that may be less than the first distance.

The opening may be further configured to receive a fastener that secures the apparatus with the component. The one or more ribs are configured to engage a washer, and cause, with the fastener, the washer to bend and engage the compression limiter to form a joint. The component may include a battery pack. The fastener and the washer, deformed into engagement with the compression limiter, attach the skid plate and the battery pack to the vehicle. The skid plate may include a first dimension from the first surface to the second surface, the skid plate may include a second dimensions from the one or more ribs to the second surface, and the compression limiter may include a third dimension that may be greater than the first dimension and less than the second dimension. The first surface may face away from the component, and the second surface may face the component.

The one or more ribs may include a first rib on a first side of the opening. The one or more ribs may further include a second rib on a second side of the opening. The second side may be opposite the first side. The first rib may be parallel with respect to the second rib, and the first rib may be spaced from the second rib that allows the first rib and the second rib to engage a washer.

According to one or more aspects of the present disclosure, a method is described. The method may include placing a planar washer in contact with at least one rib that protrudes from a skid plate for a vehicle. The method may further include providing a fastener through an opening in the planar washer and an opening in the skid plate. The method may further include providing, with the fastener, a force on the planar washer that, in combination with an opposing force provided by the at least one rib on the planar washer, deforms the planar washer into contact with a compression limiter disposed within the opening in the skid plate. The planar washer may be deformed to form, in part, a joint that attaches the skid plate to a vehicle body of the vehicle.

The method may further include providing the fastener through an opening in a battery pack enclosure, and an opening in a body of the vehicle. Further, providing the force may include applying a torque to the fastener.

BRIEF DESCRIPTION OF THE DRAWINGS

Certain features of the subject technology are set forth in the appended claims. However, for purpose of explanation, several embodiments of the subject technology are set forth in the following figures.

FIG. 11 illustrates a flow diagram showing a process for forming a joint to secure components together, in accordance with one or more implementations of the present disclosure.

FIG. 12 illustrates a flow diagram showing a process for forming an apparatus, in accordance with one or more implementations of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

This disclosure is generally directed to a joint between a skid plate and battery pack enclosure (carrying a battery pack), as well as between the battery pack enclosure and a vehicle body. The skid plate may take the form of a compression molded structure formed from polypropylene embedded with glass fibers. In order secure the skid plate, several fasteners may pass through respective openings of a battery enclosure and the skid plate, and subsequently fasten to the vehicle body. Each of the openings of the skid plate may receive a compression limiter. Further, each of the openings may be surrounded by ribs designed to engage a washer. Based on an applied torque to a fastener passing through the washer and a skid plate opening, the fastener and the ribs cause the washer to bend in two dimensions. The applied torque causes the washer to engage the compression limiter and form the joint. Beneficially, the joint remains reliable over time to secure the battery to the vehicle body, even as the skid plate and the compression limiter may separate over time due to, for example, thermal cycling from the battery pack and/or impact from a foreign object to the skid plate.

Figure 1A:
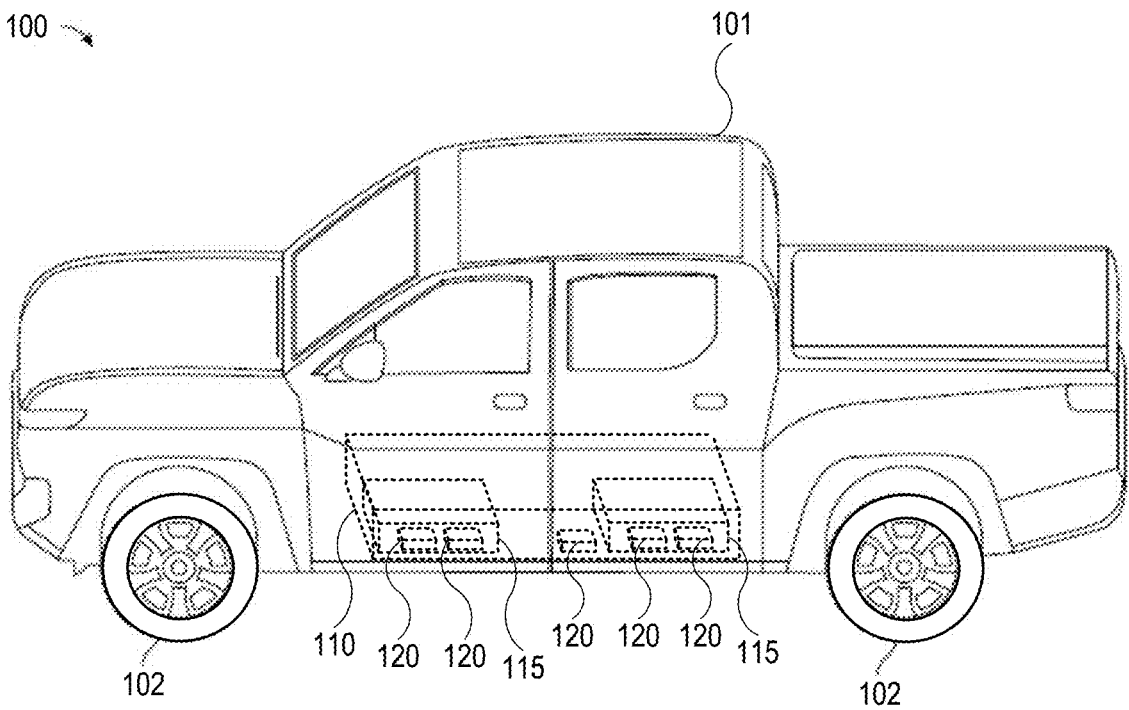
FIG. 1A and FIG. 1B illustrate schematic perspective side views of example implementations of a vehicle having a battery pack, in accordance with one or more implementations of the present disclosure.

FIG. 1A illustrates an example implementation of a moveable apparatus as described herein. In the example of FIG. 1A, a moveable apparatus is implemented as a vehicle 100. The vehicle 100 may include a vehicle body 101 designed to carry several components. For example, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle 100 using electric power from the battery pack 110. In one or more implementations, the vehicle 100 may also, or alternatively, include one or more engines, or motors, including chemically-powered engines, such as a gas-powered engine or a fuel cell powered motor. For example, in one or more implementations, the vehicle 100 includes one or more electric motors, and the vehicle 100 takes the form of a fully electric or partially electric (e.g., hybrid or plug-in hybrid) vehicle.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without the battery modules 115 and with the battery cells 120 mounted directly in the battery pack 110 (e.g., in a cell-to-pack configuration) and/or in other battery units that are installed in the battery pack 110. The battery pack 110 may include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

Each of the battery cells 120 may be included a battery, a battery unit, a battery module and/or a battery pack to power components of the vehicle 100. For example, a battery cell housing of the battery cells 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle). The power stage circuit can be provided as part of the battery pack 110 or separately from the battery pack 110 within the vehicle 100.

Figure 1B:
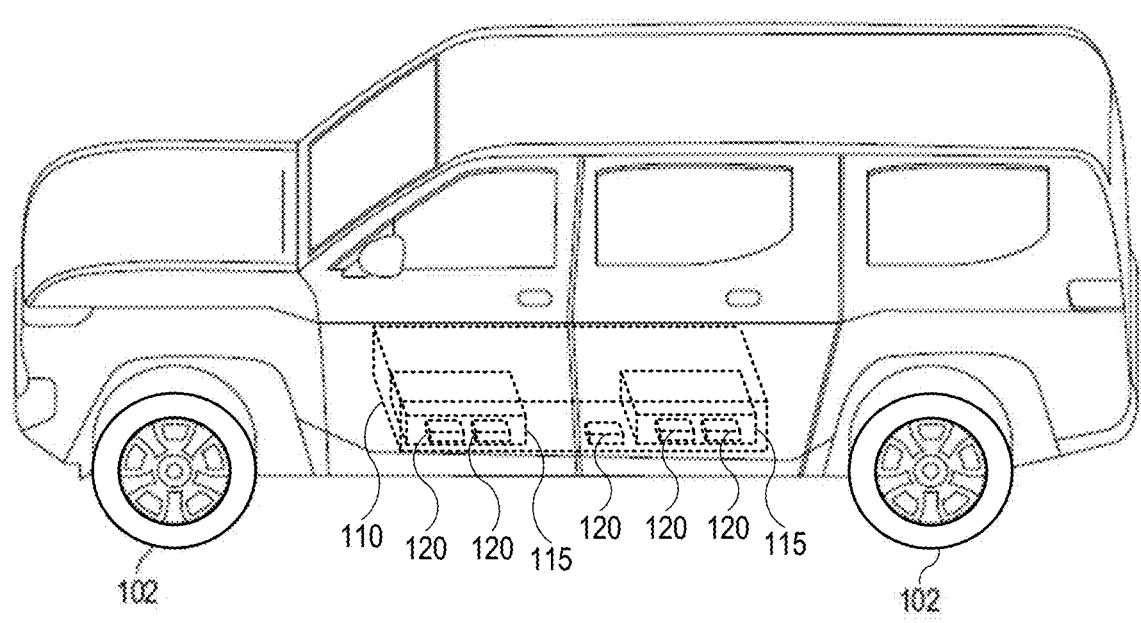

FIG. 1B illustrates another implementation in which the vehicle 100 is implemented as a sport utility vehicle (SUV), such as an electric sport utility vehicle. In the example of FIG. 1B, the vehicle 100 may include a cargo storage area that is enclosed within the vehicle 100 (e.g., behind a row of seats within a cabin of the vehicle 100). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
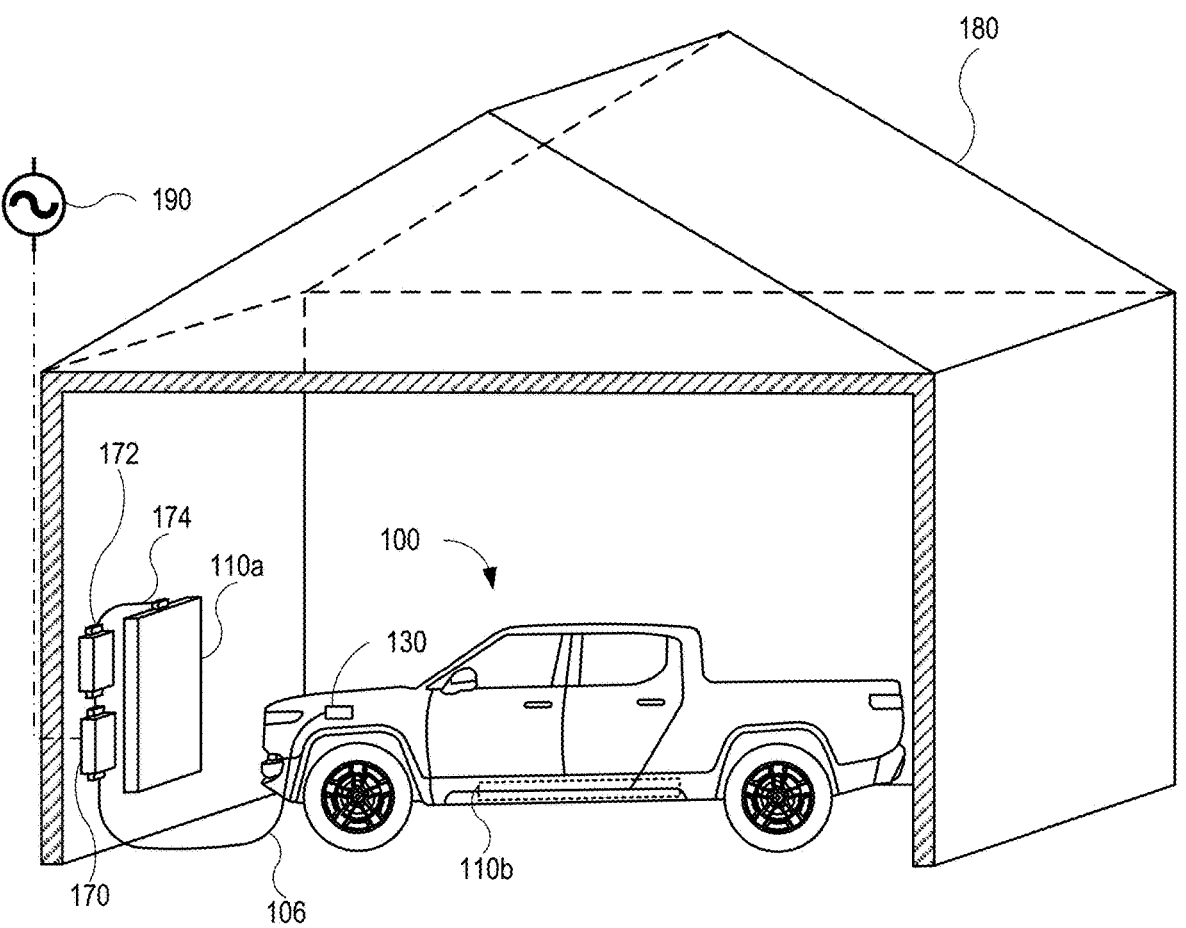
FIG. 1C illustrates a schematic perspective view of a building having a battery pack, in accordance with one or more implementations of the present disclosure.

In one or more implementations, the battery pack 110, battery modules 115, battery cells 120, and/or any other battery unit as described herein may also, or alternatively, be implemented as an electrical power supply and/or energy storage system in a building, such as a residential home or commercial building. For example, FIG. 1C illustrates an example in which a battery pack 110a is implemented in a building 180. The building 180 may be a residential building, a commercial building, or any other building. As shown, in one or more implementations, the battery pack 110a may be mounted to a wall of the building 180.

As shown, the battery pack 110a that is installed in the building 180 may be coupled (e.g., electrically coupled) to the battery pack 110b in the vehicle 100, such as via a cable/connector 106 that can be connected to a charging port 130 of the vehicle 100, an electric vehicle supply equipment 170 (EVSE), a power stage circuit 172, and/or a cable/connector 174. For example, the cable/connector 106 may be coupled to the EVSE 170, which may be coupled to the battery pack 110a via the power stage circuit 172, and/or may be coupled to an external power source 190. In this way, either the external power source 190 or the battery pack 110a may be used as an external power source to charge the battery pack 110b in some use cases. In one or more implementations, the battery pack 110a may also, or alternatively, be coupled (e.g., via a cable/connector 174, the power stage circuit 172, and the EVSE 170) to the external power source 190. The external power source 190 may take the form of a solar power source, a wind power source, and/or an electrical grid of a city, town, or other geographic region (e.g., electrical grid that is powered by a remote power plant). During, for example, instances when the battery pack 110b is not coupled to the battery pack 110a, the battery pack 110a may couple (e.g., using the power stage circuit 172) to the external power source 190 to charge up and store electrical energy. In some use cases, this stored electrical energy in the battery pack 110a may later be used to charge the battery pack 110b (e.g., during times when solar power or wind power is not available, in the case of a regional or local power outage for the building 180, and/or during a period of high rates for access to the electrical grid).

In one or more implementations, the power stage circuit 172 may electrically couple the battery pack 110a to an electrical system of the building 180. For example, the power stage circuit 172 may convert DC power from the battery pack 110a into AC power for one or more loads in the building 180. Exemplary loads coupled, via one or more electrical outlets coupled, to the battery pack 110a may include one or more lights, lamps, appliances, fans, heaters, air conditioners, and/or any other electrical components or electrical loads. The power stage circuit 172 may include control circuitry that is operable to switchably couple the battery pack 110a between the external power source 190 and one or more electrical outlets and/or other electrical loads in the electrical system of the building 180. In one or more implementations, the vehicle 100 may include a power stage circuit (not shown in FIG. 1C) that can be used to convert power received from the EVSE 170 to DC power that is used to power/charge the battery pack 110b, and/or to convert DC power from the battery pack 110 into AC power for one or more electrical systems, components, and/or loads of the vehicle 100.

In one or more use cases, the battery pack 110a may be used as a source of electrical power for the building 180, such as during times when solar power or wind power is not available, in the case of a regional or local power outage for the building 180, and/or during a period of high rates for access to the electrical grid, as non-limiting examples. In one or more other use cases, the battery pack 110b may be used to charge the battery pack 110a and/or to power the electrical system of the building 180 (e.g., in a use case in which the battery pack 110a is low on or out of stored energy and in which solar power or wind power is not available, a regional or local power outage occurs for the building 180, and/or a period of high rates for access to the electrical grid occurs, as non-limiting examples.

Figure 2A:
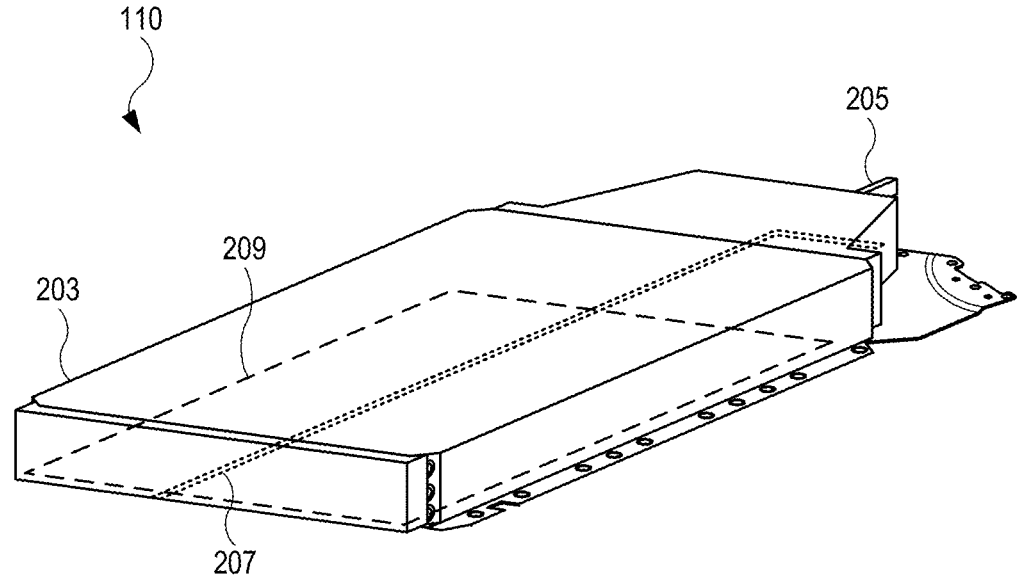
FIG. 2A illustrates a schematic perspective view of a battery pack, in accordance with one or more implementations of the present disclosure.

FIG. 2A illustrates an example of a battery pack 110. As shown, the battery pack 110 may include a battery pack frame 203 (e.g., a battery pack housing or pack frame). The battery pack frame 203 may house or enclose one or more battery modules and/or one or more battery cells, and/or other battery pack components of the battery pack 110. In one or more implementations, the battery pack frame 203 may include or form a shielding structure on an outer surface thereof (e.g., a bottom thereof and/or underneath one or more battery module, battery units, batteries, and/or battery cells) to protect the battery module, battery units, batteries, and/or battery cells from external conditions (e.g., if the battery pack 110 is installed in a vehicle and the vehicle is driven over rough terrain, such as off-road terrain, trenches, rocks, rivers, streams, etc.).

The battery pack 110 may include battery cells (e.g., directly installed within the battery pack 110, or within batteries, battery units, and/or battery modules as described herein) and/or battery modules, and one or more conductive coupling elements for coupling a voltage generated by the battery cells to a power-consuming component, such as the vehicle 100 (shown in FIGS. 1A, 1B, and 1C) and/or an electrical system of the building 180 (shown in FIG. 1C). For example, the conductive coupling elements may include internal connectors and/or contactors that couple together multiple battery cells, battery units, batteries, and/or multiple battery modules within the battery pack frame 203 to generate a desired output voltage for the battery pack 110. The battery pack 110 may also include one or more external connection ports, such as an electrical contact 205 (e.g., a high voltage terminal or connector). As shown, the battery pack 110 may include an electrical contact 205 may electrically couple an external load (e.g., the vehicle or an electrical system of the building) to the battery modules and/or battery cells in the battery pack 110. In this regard, an electrical cable (e.g., cable/connector 106) may be connected between the electrical contact 205 and an electrical system of a vehicle or a building, to provide electrical power to the vehicle or the building.

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules, battery units, batteries, and/or battery cells within the battery pack frame 203, such as by distributing fluid through the battery pack 110. The thermal control structures 207 may form a part of a thermal/temperature control or heat exchange system that includes one or more thermal components 209, which may include plates or bladders that are disposed in thermal contact with one or more battery modules and/or battery cells disposed within the battery pack frame 203. The one or more thermal components 209 may be positioned in contact with one or more battery modules, battery units, batteries, and/or battery cells within the battery pack frame 203. The one or multiple thermal control structures 207 may be provided for each of several top and bottom battery module pairs.

Figure 2B:
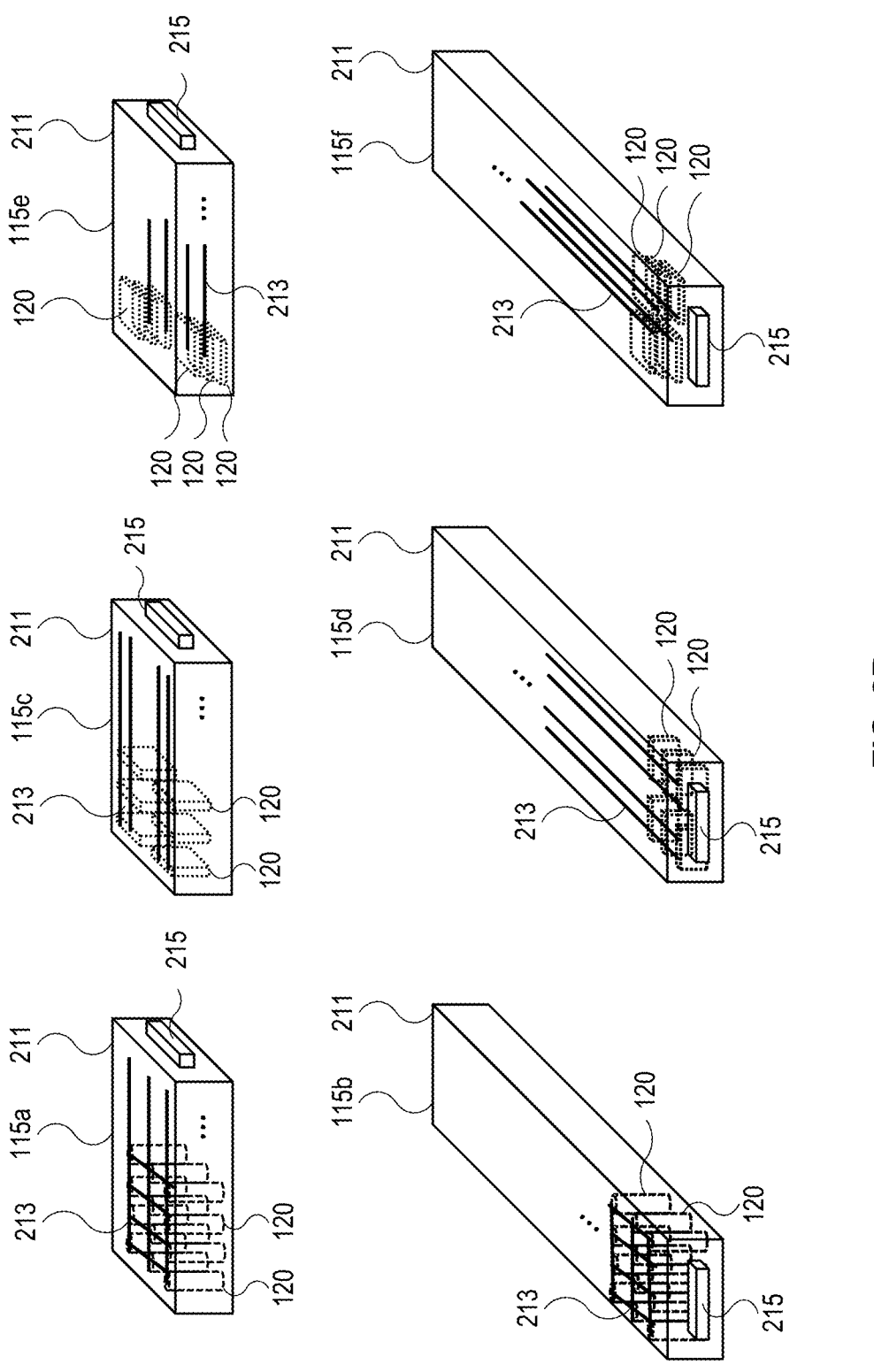
FIG. 2B illustrates schematic perspective views of various battery modules that may be included in a battery pack, in accordance with one or more implementations of the present disclosure.

FIG. 2B depicts various examples of battery modules that may be disposed in a battery pack (e.g., within the battery pack frame 203 of the battery pack 110, shown in FIG. 2A). In an example of FIG. 2B, a battery module 115a is shown that includes a battery module housing 211 having a rectangular cuboid shape with a length that is substantially similar to its width. In this example, the battery module 115a includes battery cells 120 implemented as cylindrical battery cells. The battery module 115a further includes rows and columns of cylindrical battery cells that are coupled together by an interconnect structure 213 (e.g., a current connector assembly or CCA). For example, the interconnect structure 213 may couple together the positive terminals of the battery cells 120, and/or couple together the negative battery terminals of the battery cells 120. As shown, the battery module 115a may further include a bus bar 215 that functions as a charge collector. For example, the bus bar 215 may be electrically coupled to the interconnect structure 213 to collect the charge generated by the battery cells 120 to provide a high voltage output from the battery module 115a.

FIG. 2B also shows a battery module 115b having an elongate shape. The battery module 115b may include a battery module housing 211 in which the length of the (e.g., extending along a direction from a front end to a rear end of the battery module housing 211) is substantially greater than a width (e.g., in a transverse direction to the direction from the front end to the rear end) of the battery module housing 211). In this regard, the battery module 115b (representative of one or more similar battery modules) may span the entire front-to-back length of a battery pack within a battery pack frame. As shown, the battery module 115a may further include an interconnect structure 213 electrically coupled to a bus bar 215, allowing the bus bar 215 may be electrically coupled to the interconnect structure 213 to collect the charge generated by battery cells 120 of the battery module 115b to provide a high voltage output from the battery module 115b.

In the implementations of battery module 115a and battery module 115a, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115c having a battery module housing 211 with a rectangular cuboid shape with a length that is substantially similar to its width and including battery cells 120 implemented as prismatic battery cells. In this example, the battery module 115c includes rows and columns of battery cells 120 that are coupled together by an interconnect structure 213 (e.g., a current collector assembly or CCA). For example, the interconnect structure 213 may couple together the positive terminals of the battery cells 120 and/or couple together the negative battery terminals of the battery cells 120. As shown, the battery module 115c may include a bus bar 215 that functions as a charge collector. For example, the bus bar 215 may be electrically coupled to the interconnect structure 213 to collect the charge generated by the battery cells 120 to provide a high voltage output from the battery module 115c.

FIG. 2B also shows a battery module 115d including prismatic battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. As shown, the battery module 115d may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115d.

As another example, FIG. 2B also shows a battery module 115e having a battery module housing 211 having a rectangular cuboid shape with a length that is substantially similar to its width. The battery module housing 211 may carry battery cells 120, each of which being implemented as pouch battery cells. In this example, the battery module 115e includes rows and columns of pouch battery cells that are coupled together by an interconnect structure 213 (e.g., a current collector assembly or CCA). For example, the interconnect structure 213 may couple together the positive terminals of the battery cells 120 and couple together the negative battery terminals of the battery cells 120. As shown, the battery module 115e may also include a bus bar 215 electrically coupled to the interconnect structure 213. For example, the bus bar 215 may be electrically coupled to the interconnect structure 213 to collect the charge generated by the battery cells 120 to provide a high voltage output from the battery module 115c.

FIG. 2B also shows a battery module 115f including pouch battery cells and having an elongate shape. For example, the battery module 115d includes a battery module housing 211 in which the length of the battery module housing 211 is substantially greater than a width of the battery module housing 211. In this regard, the battery module 115*d* (representative of one or more similar battery modules) may span the entire front-to-back length of a battery pack within a battery pack frame. In this regard, the battery module 115*f* (representative of one or more similar battery modules) may span the entire front-to-back length of a battery pack within a battery pack frame. As shown, the battery module 115*f* may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115*f*.

In various implementations, a battery pack (e.g., battery pack 110 shown in FIG. 2A) may be provided with one or more of any of the battery modules 115*a*, 115*b*, 115*c*, 115*d*, 115*e*, and 115*f*. In one or more other implementations, a battery pack may be provided without any of the battery modules 115*a*, 115*b*, 115*c*, 115*d*, 115*e*, and 115*f* (e.g., in a cell-to-pack implementation).

In one or more implementations, battery modules in any of the implementations of FIG. 2B may be coupled (e.g., in series) to a current collector of a battery pack. In one or more implementations, the current collector may be coupled, via a high voltage harness, to one or more external connectors on a battery pack (e.g., electrical contact 205 of the battery pack 110, shown in FIG. 2A). In one or more implementations, a battery pack may be provided without any battery modules 115. For example, in a cell-to-pack configuration, the battery cells 120 are arranged directly into a battery pack without assembly into a battery module (e.g., without including the battery module housing 211). For example, a battery pack frame of a battery pack (e.g., the battery pack frame 203 of the battery pack 110 shown in FIG. 2A) may include or define a plurality of structures for positioning of the battery cells 120 directly within the battery pack frame.

Figure 2C:
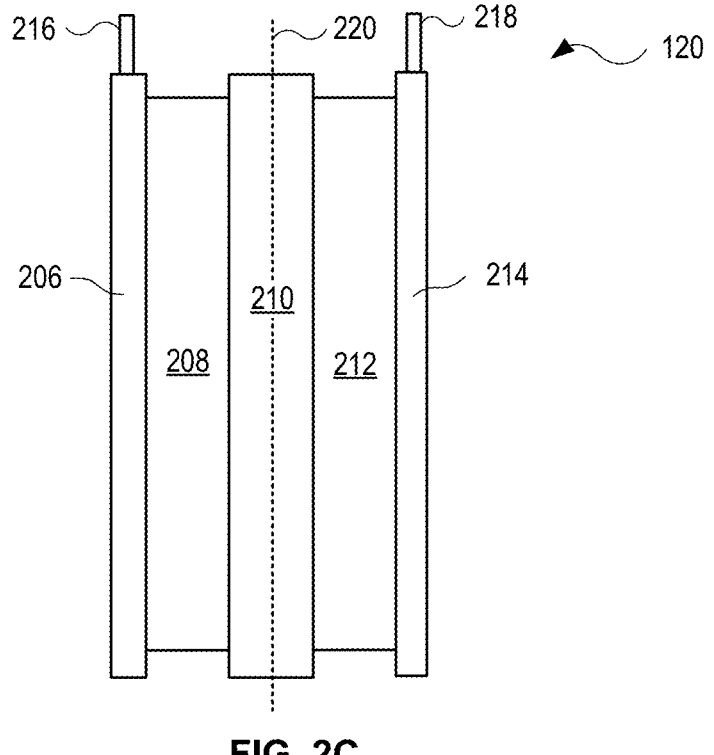
FIG. 2C illustrates a cross-sectional end view of a battery cell, in accordance with one or more implementations of the present disclosure.

FIG. 2C illustrates a cross-sectional end view of a portion of a battery cell 120. As shown, the battery cell 120 may include an anode 208, an electrolyte 210, and a cathode 212. As shown, the anode 208 may include or be electrically coupled to a first current collector 206 (e.g., a metal layer such as a layer of copper foil or other metal foil). Also, the cathode 212 may include or be electrically coupled to a second current collector 214 (e.g., a metal layer such as a layer of aluminum foil or other metal foil). The battery cell 120 may further include a terminal 216 (e.g., a negative terminal) coupled to the anode 208 (e.g., via the first current collector 206) and a terminal 218 (e.g., a positive terminal) coupled to the cathode (e.g., via the second current collector 214). In various implementations, the electrolyte 210 may take the form of a liquid electrolyte layer or a solid electrolyte layer. In one or more implementations in which the electrolyte 210 is a liquid electrolyte layer, the battery cell 120 may include a separator layer 220 that separates the anode 208 from the cathode 212. In one or more implementations in which the electrolyte 210 is a solid electrolyte layer, the electrolyte 210 may function as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. In an implementation in which the battery cell 120 is implemented as a lithium-ion battery cell, the electrolyte 210 may include a lithium salt in an organic solvent.

The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cell 120 is implemented as lithium-ion battery cells, the battery cell 120 may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials. In various implementations, the anode 208, the electrolyte 210, and the cathode 212 can be packaged into a battery cell housing having any of various shapes, and/or sizes, and/or formed from any of various suitable materials. For example, the battery cell 120 may include a cylindrical, rectangular, square, cubic, flat, pouch, elongated, or prismatic outer shape.

Figure 2D:
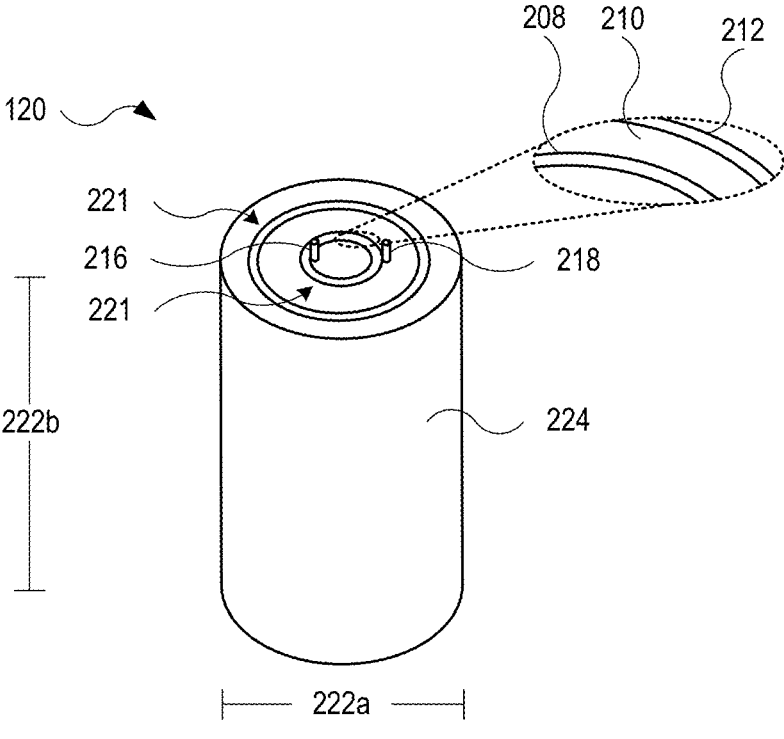
FIG. 2D illustrates a cross-sectional perspective view of a cylindrical battery cell, in accordance with one or more implementations.

As depicted in FIG. 2D, for example, a battery cell 120 may be implemented as a cylindrical cell. Accordingly, the battery cell 120 includes dimension 222*a* (e.g., cylinder diameter, battery cell diameter) and a dimension 222*b* (e.g., cylinder length). The battery cell 120, and other battery cells described herein, may include dimensional information derived from a 4-number code. For example, in some embodiments, the battery cell 120 includes an XXYY battery cell, in which "XX" refers to the dimension 222*a* in millimeters (mm) and "YY" refers to the dimension in mm. Accordingly, when the battery cell 120 includes a "2170" battery cell, the dimension 222*a* is 21 mm and the dimensions 222*b* is 70 mm. Alternatively, when the battery cell 120 includes a "4680" battery cell, the dimension 222*a* is 46 mm and the dimensions 222*b* is 80 mm. The foregoing examples of dimensional characteristics for the battery cell 120 should not be construed as limiting, and the battery cell 120, and other battery cells described herein with a cylindrical form factor, may include various dimension. For example, the dimension 222*a* and the dimension 222*b* may be greater than 46 mm and 80 mm, respectively.

FIG. 2D illustrates a battery cell 120 that includes a cell housing 224 having a cylindrical outer shape. As shown in the enlarged view, the anode 208, the electrolyte 210, and the cathode 212 may be rolled into one or more windings 221. The one or more windings 221 may include one or more substantially cylindrical windings, as a non-limiting example. As shown, one or more windings 221 of the anode 208, the electrolyte 210, and the cathode 212 (e.g., and/or one or more separator layers such as separator layer 220 shown in FIG. 2C) may be disposed within the cell housing 224. For example, a separator layer may be disposed between adjacent ones of the one or more windings 221. Additionally, the battery cell 120 in the cylindrical cell implementation of FIG. 2D includes a terminal 216 and a terminal 218. The terminal 218 may include a first polarity terminal, such as a positive terminal, that is coupled to the cathode 212. The terminal 216 may include a second polarity terminal, such as a negative terminal, that is coupled to the anode 208. The terminals 216 and 218 can be made from electrically conductive materials to carry electrical current from the battery cell 120 directly or indirectly (e.g., via a current carrier assembly, a bus bar, and/or other electrical coupling structures) to an electrical load, such as a component or system of a vehicle or a building shown and/or described herein. However, the cylindrical cell implementation of FIG. 2D is merely illustrative, and other implementations of the battery cells 120 are contemplated.

Figure 2E:
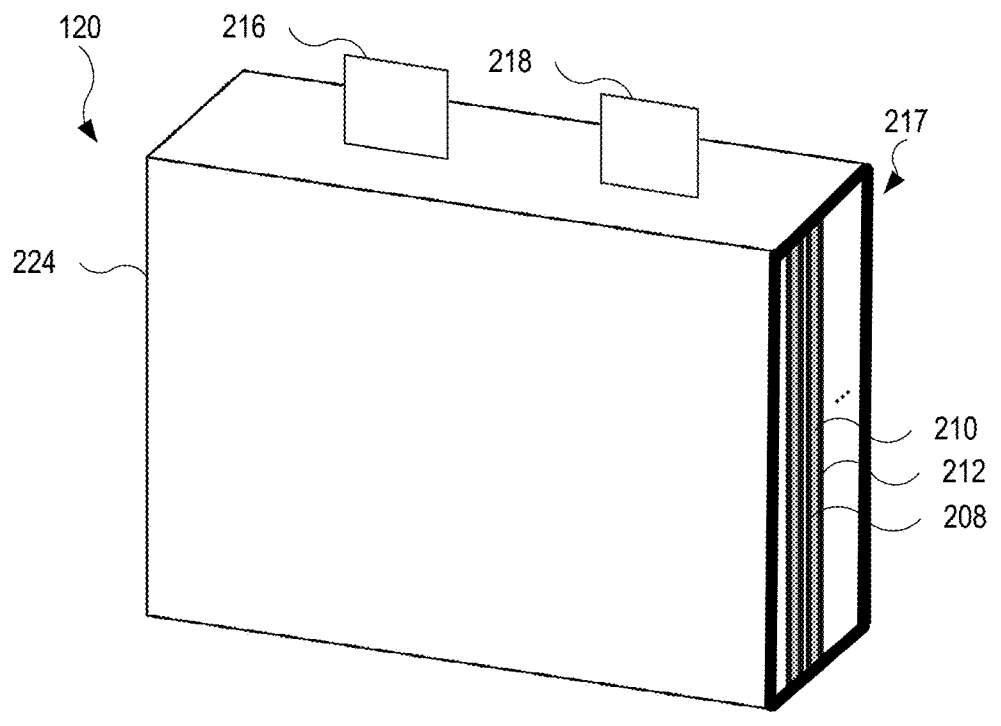
FIG. 2E illustrates a cross-sectional perspective view of a prismatic battery cell, in accordance with one or more implementations of the present disclosure.

FIG. 2E illustrates an example in which the battery cell 120 is implemented as a prismatic cell. As shown, the battery cell 120 may include a cell housing 224 having a right prismatic outer shape. Also, one or more layers of the anode 208, the cathode 212, and the electrolyte 210 disposed therebetween may be disposed (e.g., with separator materials between the layers) within the cell housing 224. As examples, multiple layers of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224. The cell housing 224 may include a cross-sectional width 217 that is relatively thick and is formed from a rigid material. For example, the cell housing 224 may be formed from a welded, stamped, deep drawn, and/or impact extruded metal sheet, such as a welded, stamped, deep drawn, and/or impact extruded aluminum sheet. The cross-sectional width 217 of the cell housing 224 may be as much as, or more than 1 millimeter (mm) to provide a rigid housing for the prismatic battery cell. In one or more implementations, a terminal 216 and a terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the terminal 216 and the terminal 218 outside the cell housing 224 in order to contact an interconnect structure (e.g., interconnect structure 213 shown in FIG. 2B). However, this implementation of FIG. 2E is also illustrative and yet other implementations of the battery cell 120 are contemplated.

Figure 2F:
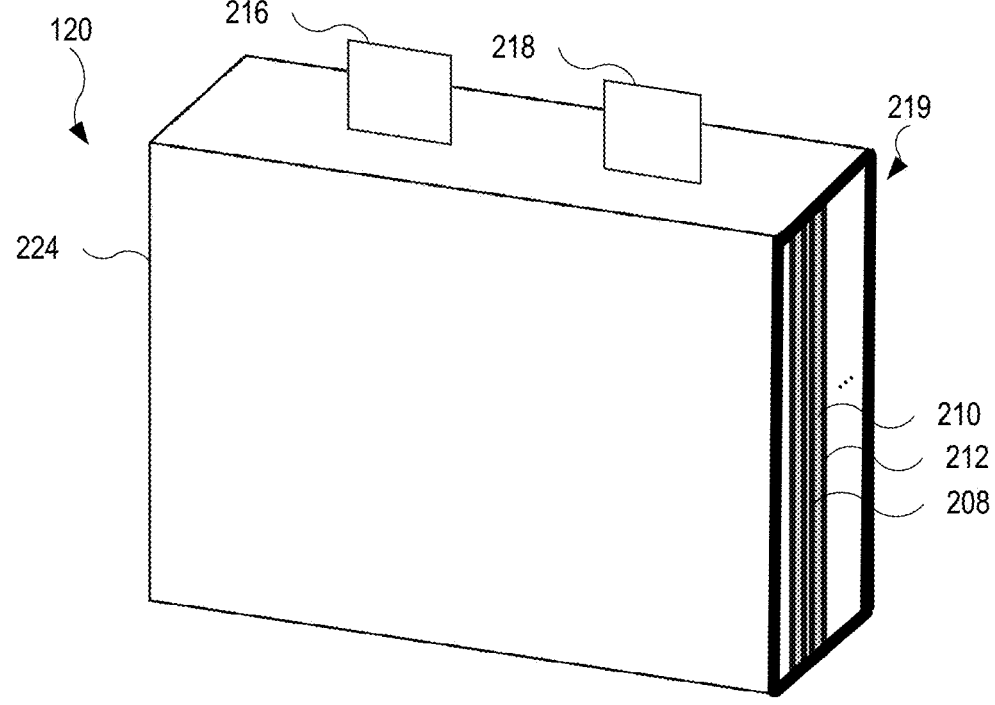
FIG. 2F illustrates a cross-sectional perspective view of a pouch battery cell, in accordance with one or more implementations of the present disclosure.

FIG. 2F illustrates an example in which the battery cell 120 is implemented as a pouch cell. As shown, the battery cell 120 may include a cell housing 224 that forms a flexible or malleable pouch housing. One or more layers of the anode 208, the cathode 212, and the electrolyte 210 disposed therebetween may be disposed (e.g., with separator materials between the layers) within the cell housing 224. In the implementation of FIG. 2F, the cell housing 224 may include a cross-sectional width 219 that is relatively thin. For example, the cell housing 224 in the implementation of FIG. 2F may be formed from a flexible or malleable material (e.g., a foil, such as a metal foil, or film, such as an aluminum-coated plastic film). The cross-sectional width 219 of the cell housing 224 may be as low as, or less than, 0.1 mm, 0.05 mm, 0.02 mm, or 0.01 mm to provide flexible or malleable housing for the pouch battery cell. In one or more implementations, a terminal 216 and a terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the terminal 216 and the terminal 218 are formed on the same side (e.g., a top side) of the battery cell 120. However, this is merely illustrative and, in other implementations, the terminal 216 and the terminal 218 may formed on two different sides (e.g., opposing sides, such as a top side and a bottom side) of the battery cell 120. The terminal 216 and the terminal 218 may be formed on a same side or difference sides of the cylindrical cell of FIG. 2D in various implementations.

In one or more implementations, a battery module, a battery pack, a battery unit, or any other battery may include some battery cells that are implemented as solid-state battery cells and other battery cells that are implemented with liquid electrolytes for lithium-ion or other battery cells having liquid electrolytes. In one or more implementations, one or more of the battery cells may be included a battery module or a battery pack, such as to provide an electrical power supply for components of a vehicle and/or a building previously described, or any other electrically powered component or device. A cell housing of the battery cell can be disposed in the battery module, the battery pack, or installed in any of the vehicle, the building, or any other electrically powered component or device.

Figure 3:
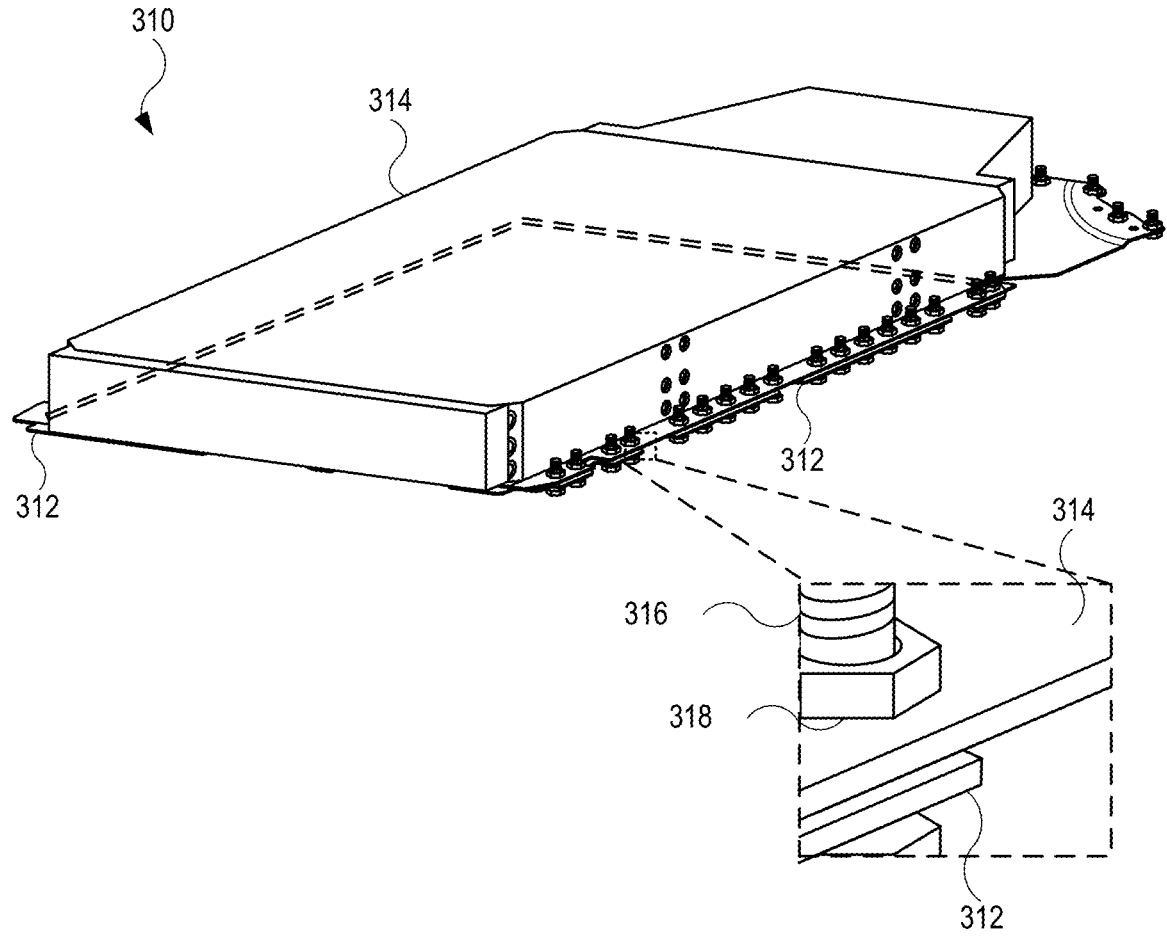
FIG. 3 illustrates a perspective view of a battery pack and an apparatus, in accordance with one or more implementations of the present disclosure.

FIG. 3 illustrates a perspective view of a battery pack 310 and an apparatus 312, in accordance with one or more implementations of the present disclosure. The battery pack 310 may include battery cells in any form described herein, including cylindrical battery cells, prismatic battery cells, pouch battery cells, or a combination thereof. As shown, the battery pack 310 may include a battery pack enclosure 314 designed to enclose battery cells of the battery pack 310.

The apparatus 312 may secure to the battery pack enclosure 314, including a bottom portion, or underside, of the battery pack enclosure 314. In one or more implementations, the apparatus 312 takes the form of a skid plate designed to protect a vehicle to which the battery pack 310 is secured. In this regard, the apparatus 312 may protect the battery pack 310, as well as other vehicle components, and provide damage protection for the battery pack 310, including a bottom surface of the battery pack 310, due to foreign objects and/or from the vehicle bottoming out during operation. Also, the dimensions (e.g., area) of the apparatus 312 may be larger than those of the battery pack enclosure 314 to ensure the apparatus 312 covers and protects a bottom side of the battery pack enclosure 314, and in particular, the battery cells in the battery pack enclosure 314.

The apparatus 312 may include a planar, or generally planar, body. Further, in one or more implementations, the apparatus 312 may include a body formed from a polymer-based material (or materials), such as polypropylene. The apparatus 312 may include a composite material that includes one or more materials. Additionally, in order to enhance the strength and structural rigidity, the apparatus 312 may include fibers (e.g., glass fibers) embedded in the body. In some instances, a molding operation (e.g., compression molding) is used to form the apparatus 312.

The apparatus 312 may secure with the battery pack enclosure 314 using several fasteners. For example, as shown in the enlarged view, a fastener 316 (representative of several additional fasteners) passes through respective openings of the apparatus 312 and the battery pack enclosure 314, and couples to a nut 318 (representative of several additional nuts). The fastener 316 and the nut 318 may couple together by a threaded engagement, as a non-limiting example.

FIG. 4, FIG. 5, FIG. 6, FIG. 7, FIG. 8, and FIG. 10 show the apparatus 312 rotated 180 degrees, or approximately 180 degrees, to show details of the apparatus 312.

Figure 4:
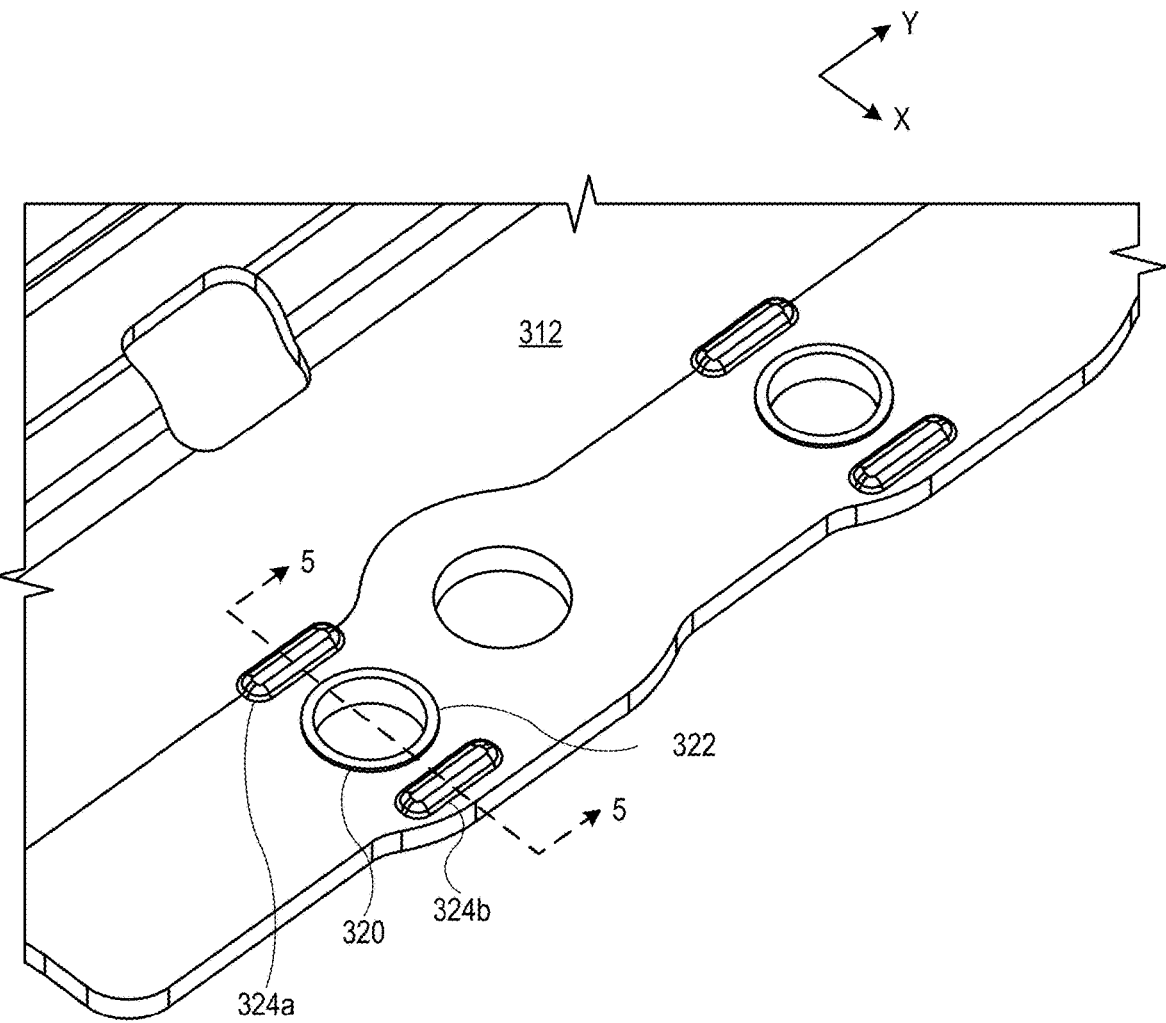
FIG. 4 illustrates a perspective view of an example of an apparatus, showing features of the apparatus, in accordance with one or more implementations of the present disclosure.

FIG. 4 illustrates a perspective view of an example of the apparatus 312, showing features of the apparatus 312, in accordance with one or more implementations of the present disclosure. For purposes of simplicity and illustration, a portion of the apparatus 312 is shown. The apparatus 312 may include an opening 320 (representative of additional openings) designed to receive a fastener (e.g., fastener 316 shown in FIG. 3). The opening 320 may include a circular, or substantially circular, opening. However, other shapes are possible.

The opening 320 may receive a compression limiter 322 (representative of additional compression limiters). The compression limiter 322 may take the form of a ring. Generally, the compression limiter 322 may include a shape corresponding to that of the opening 320. In one or more implementations, the compression limiter 322 includes steel. Further, the compression limiter 322 may form part of a joint with a fastener to secure the apparatus 312 to another component. This will be shown and described below. In one or more implementations, the compression limiter 322 may be (e.g., temporarily, prior to fastening with the fastener) secured within the opening 320 by a press fit or a compression fit.

The apparatus 312 may include several ribs. For example, the apparatus 312 may include a rib 324a and a rib 324b. The ribs 324a and 324b may surround the opening 320 as well as the compression limiter 322. As shown, the opening 320 is centered with respect to the ribs 324a and 324b. In one or more implementations, each of the ribs 324a and 342b extend in a single direction and may be referred to as linear ribs. Put another way, a major dimensions of each of the ribs 324a and 324b may extend along an axis (e.g., Y-axis shown in FIG. 4). However, it should be noted that ribs of other shapes may be possible, including but not limited to circular ribs, semi-circular ribs, or generally some non-linear ribs. Also, as shown in FIG. 4, the rib 324a is parallel with respect to the rib 324b. However, in some instances, the ribs 324a and 324b are non-parallel with respect to each other.

Figure 5:
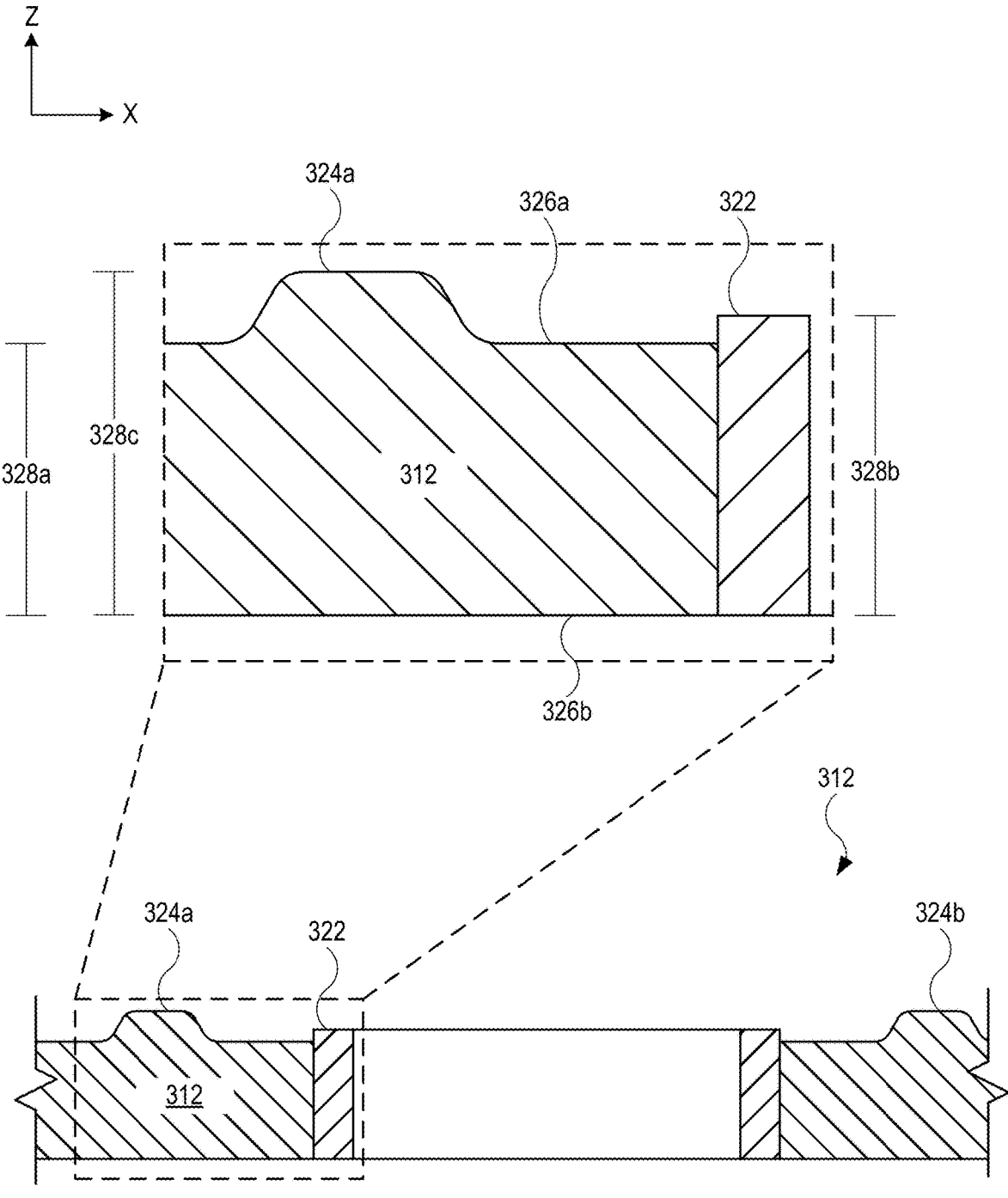
FIG. 5 illustrates a partial cross sectional view of an apparatus, taken along line 5-5 in FIG. 4, showing additional features of the apparatus, in accordance with one or more implementations of the present disclosure.

FIG. 5 illustrates a partial cross sectional view of an apparatus 312, taken along line 5-5 in FIG. 4, showing additional features of the apparatus 312, in accordance with one or more implementations of the present disclosure. In the enlarged view, several characteristics are shown. For example, the apparatus 312 may include a surface 326a on which the rib 324a (as well as the rib 324b) are positioned. The apparatus 312 may further include a surface 326b opposite the surface. When the apparatus 312 is secured with a battery pack enclosure (e.g., battery pack enclosure 314 shown in FIG. 3), the surface 326a faces away from the battery pack enclosure and the surface 326b faces toward the battery pack enclosure.

Several dimensional characteristics are shown. For example, the apparatus 312 may include a dimension 328a extending from the surface 326a to the surface 326b along the Z-axis. Additionally, the compression limiter 322 may include a dimension 328b measured end-to-end along the Z-axis. Further, the combination of the body of the apparatus 312 and the rib 324a may include a dimension 328c extending from the surface 326a to an uppermost surface of the rib 324a.

As shown, the dimension 328b is greater than the dimension 328a. In one or more implementations, the difference between the dimension 328b and the dimension 328a is 5 mm or less. Accordingly, the difference between the dimension 328b and the dimension 328a may be 2 mm or less, or even 1 mm or less. Generally, the dimension 328b of the compression limiter 322 may be selected so as to ensure the dimension 328b is greater than the dimension 328a of the apparatus 312 when accounting for manufacturing tolerances of the apparatus 312. Also, the dimension 328c is greater than the dimension 328b, and accordingly, the dimension 328c is greater than the dimension 328a. In one or more implementations, the difference between the dimension 328c and the dimension 328b is 2 mm or less. Accordingly, the difference between the dimension 328c and the dimension 328b may be 1 mm or less. With respect to dimensional differences, the dimension 328b of the compression limiter 322 may be adjusted so long as the dimension 328c (of the combination of the body of the apparatus 312 and the rib 324a) is greater than the dimension 328b.

Further, based upon the dimensional information, the rib 324a may extend from the surface 326a to a distance (e.g., a first distance) represented by a difference between dimension 328c and the dimension 328a. The compression limiter 322 may extend, relative to the surface 326a, to a distance (e.g., a second distance) represented by a difference between the dimension 328b and the dimension 328a. Based on the respective dimensions, the second distance is less than the first distance. Accordingly, the rib 324a (representative of the rib 324b) may extend, along the Z-axis, above the compression limiter 322.

Although not expressly shown, in one or more implementations, the dimensions 328a and 328b may be the same or substantially similar to each other. In this regard, in some instances, the compression limiter 322 may be flush with the apparatus 312.

Figure 6:
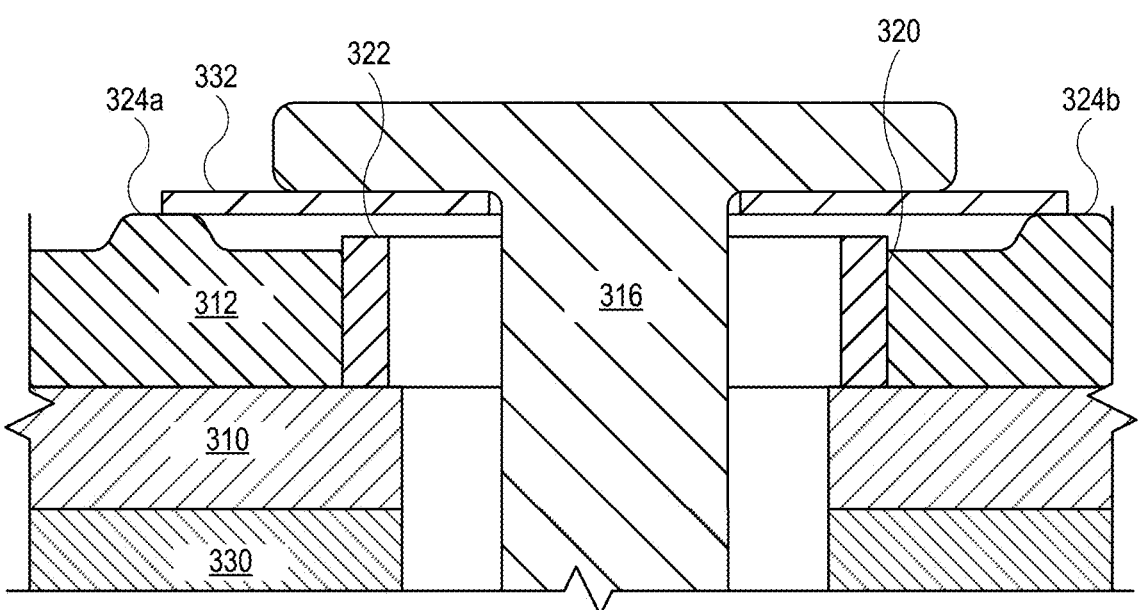
FIG. 6 illustrates a partial cross sectional view of an example of an apparatus, showing a fastener positioned in an opening of the apparatus, in accordance with one or more implementations of the present disclosure.

FIG. 6 illustrates a partial cross sectional view of an example of an apparatus 312, showing a fastener 316 positioned in an opening 320 of the apparatus 312, in accordance with one or more implementations of the present disclosure. Additionally, the fastener 316 may pass through respective openings of the battery pack enclosure 314 and a vehicle body 330 (or vehicle frame). In order to form a joint, a washer 332 may be incorporated. Also, the fastener 316 may pass through the washer 332 (i.e., an opening of the washer 332). The washer 332 may include a body that is circular, or substantially circular, and planar, or substantially planar. As shown, the washer 332 may lie on each of the ribs 324a and 324b. As a result, the ribs 324a and 324b may prevent contact between the washer 332 and the compression limiter 322 prior to external forces acting on the washer 332. In this regard, the apparatus 312 may be manufactured such that the ribs 324a and 324b are positioned sufficiently close to each other such that each of the ribs 324a and 234b receives at least a portion of the washer 332, as shown in FIG. 6. While the opening 320 is shown as being centered with respect to the ribs 324a and 324b, the opening may be offset and closer to one of the ribs 324a and 324b.

Figure 7:
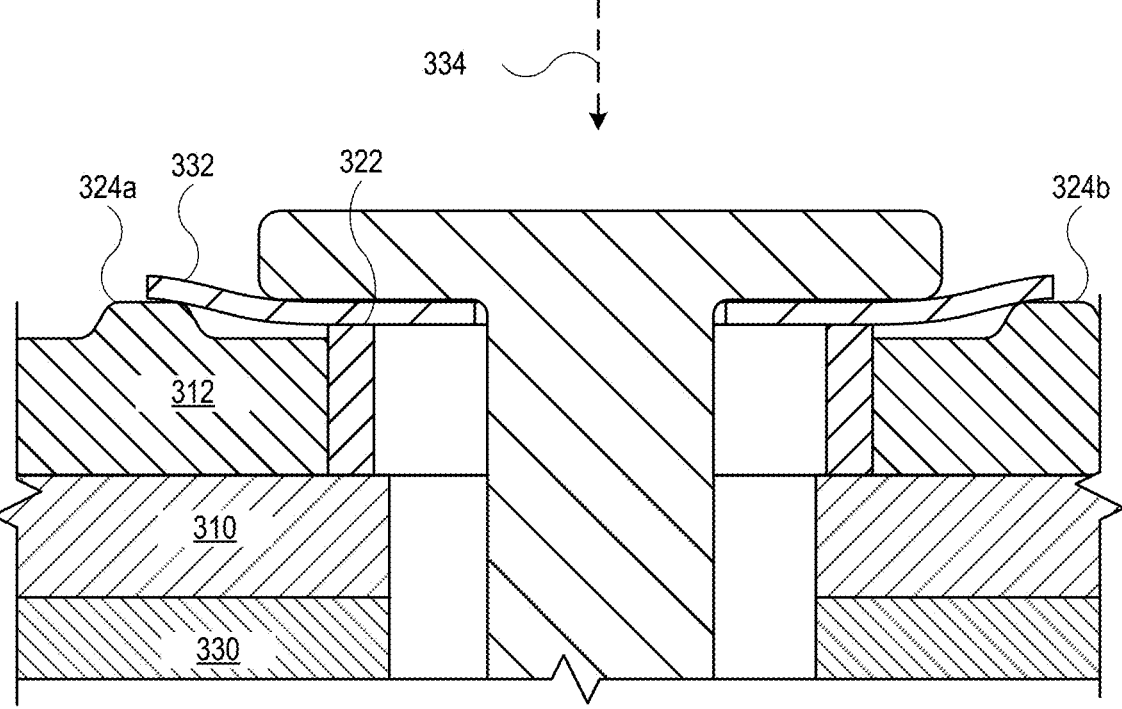
FIG. 7 illustrates a partial cross sectional view of an apparatus, showing an alteration of the washer based on movement of a fastener, in accordance with one or more implementations of the present disclosure.

FIG. 7 illustrates a partial cross sectional view of the apparatus 312, showing an alteration of the washer 332 based on movement of the fastener 316, in accordance with one or more implementations of the present disclosure. When a torque is applied to the fastener 316, the fastener 316 may move a direction represented by an arrow 334 and engage a nut (e.g., nut 318 shown in FIG. 3). As a result, the fastener 316 may apply a force that deforms, or bends, the washer 332 from its originally planar configuration. Further, the applied torque by the fastener 316 may cause the washer 332 to deform and engage the compression limiter 322, as shown in FIG. 7. Based on the washer 332 engaging the compression limiter 322 in the deformed state (e.g., bent state), the compression limiter 322 may absorb a substantial portion of the compression forces provided in part by the fastener 316. The washer 332 may also provide additional load gain. Also, each of the ribs 324a and 324b may apply a counterforce to the washer 332 that facilitates deforming of the washer 332. In this regard, the washer 332 may undergo a two-dimensional bend. Based on the parallel, or at least substantially parallel, relationship between the ribs 324a and 234b, the fastener 316 (and in particular, the fastener head of the fastener 316) may provide a force that causes the washer 332 to bend and form a reliable joint.

In one or more implementations, when the washer 332 bottoms out and engages the compression limiter 322, the fastener 316, the compression limiter 322, and the washer 332 may combine to form a joint that secures the apparatus 312 with the battery pack enclosure 314, as well the battery pack enclosure 314 with vehicle body 330. Further, the joint may resist, or at least substantially, separation of components over time due to vibrations, thermal cycling of the battery pack 310 (within the battery pack enclosure 314), or a combination thereof. Beneficially, the joint (representative of several, additional joints formed by respective fasteners, compression limiters, and washers in a similar manner) may secure the apparatus 312 and the battery pack enclosure 314 to the vehicle body 330 for the life of the vehicle use.

The compression force applied to the washer 332 on the ribs 324a and 324b (e.g., a mating surface of the washer 332 that engages the ribs 324a and 324b) may be tuned independently to the force applied to the compression limiter 322, where at least some of the applied force to the compression limiter 322 is transferred to another component. The compression force may be tuned via the material makeup of the washer 332, the geometry of the washer 332, and/or deflection (e.g., mating surface geometry) of the washer 332. The applied force to the compression limiter 322 may be tuned via the torque applied to the fastener 316, as well as by the size and/or grade of the fastener 316.

Figure 8:
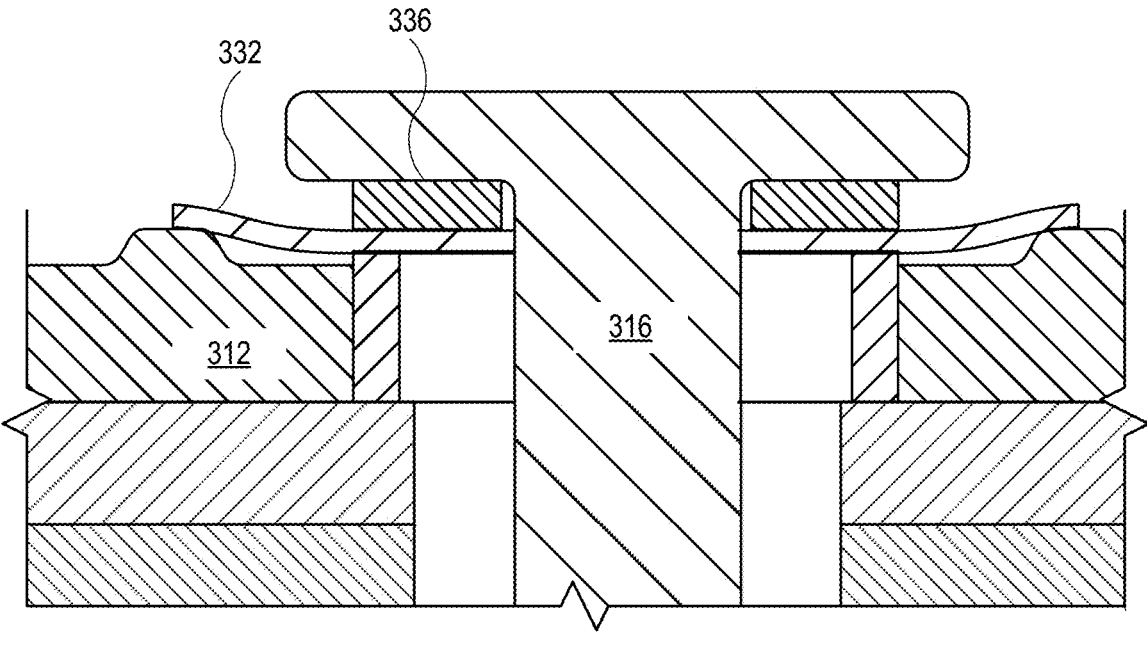
FIG. 8 illustrates a partial cross sectional view of an apparatus, showing additional features that may be incorporated to form a joint, in accordance with one or more implementations of the present disclosure.

FIG. 8 illustrates a partial cross sectional view of an apparatus 312, showing additional features that may be incorporated to form a joint, in accordance with one or more implementations of the present disclosure. In addition to the washer 332, a washer 336 may also be added and the fastener 316 may pass through the washer 336. The washer 336 may provide additional structural rigidity. Alternatively, the fastener 316, and in particular, a fastener head of the fastener 316, may increase in size (to provide additional structural rigidity) and replace the washer 336.

Figure 9A:
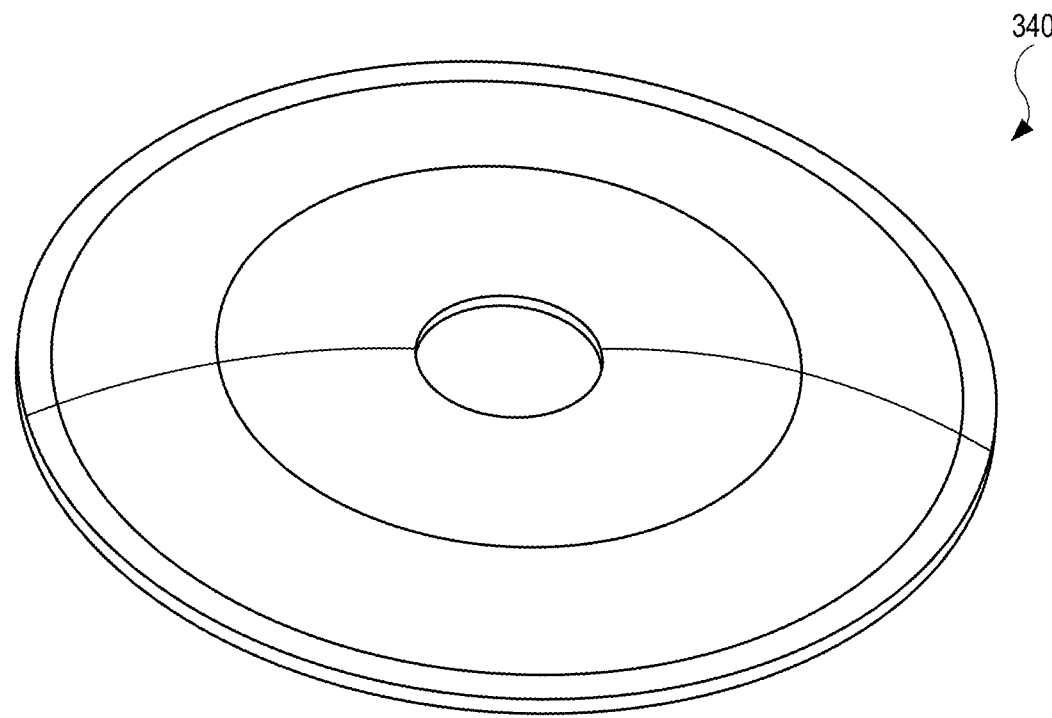
FIG. 9A and FIG. 9B illustrate perspective views of alternate examples of a washer, in accordance with one or more implementations of the present disclosure.
Figure 9B:
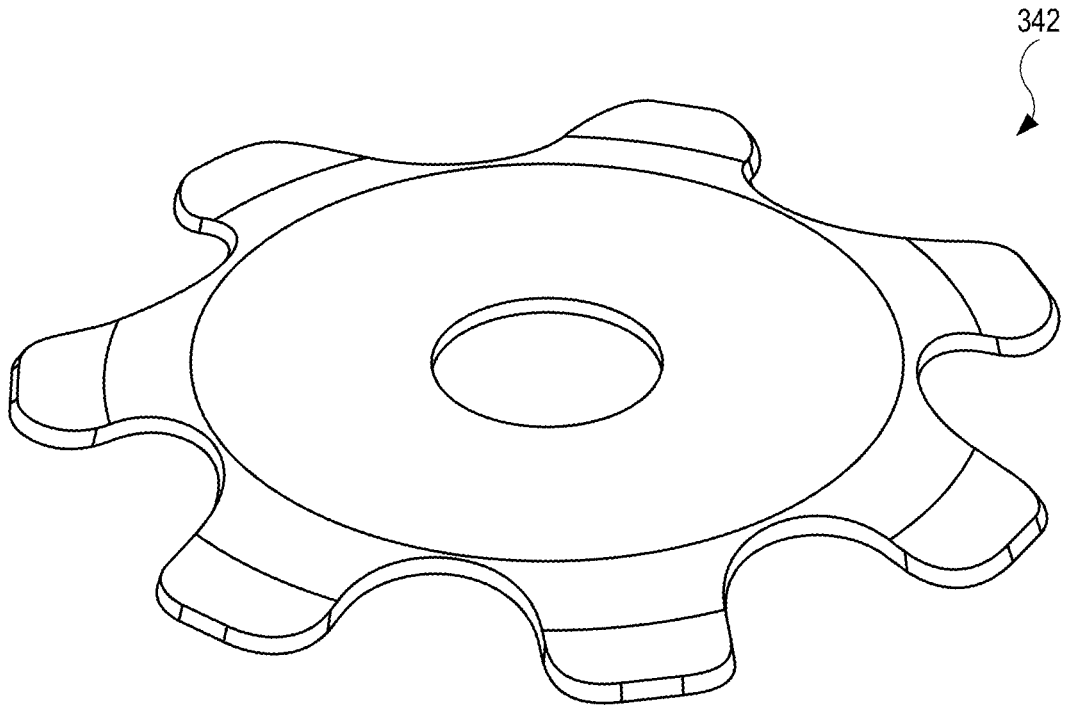

FIG. 9A and FIG. 9B illustrate perspective views of alternate examples of a washer, in accordance with one or more implementations of the present disclosure. The washers shown in FIGS. 9A and 9B may substitute for the washer 332 (shown in FIGS. 6-8). The washers shown in FIGS. 9A and 9 B may undergo different bending configurations to form joints with different properties (e.g., load resistance).

FIG. 9A illustrates a perspective view of a washer 340. The washer 340 may include a circular, or substantially circular, body. Additionally, the washer 340 may include a dome shape. In this regard, the washer 340 may be pre-tensioned and offer higher load capacity.

FIG. 9B illustrates a perspective view of a washer 342. The washer 342 may include a dome shape. Additionally, the washer 342 may take the form of a star washer. In this regard, the washer 342 may resist torque applied by a nut (not shown in FIG. 9B) that would otherwise unscrew a fastener (not shown in FIG. 9B) from the nut.

Figure 10:
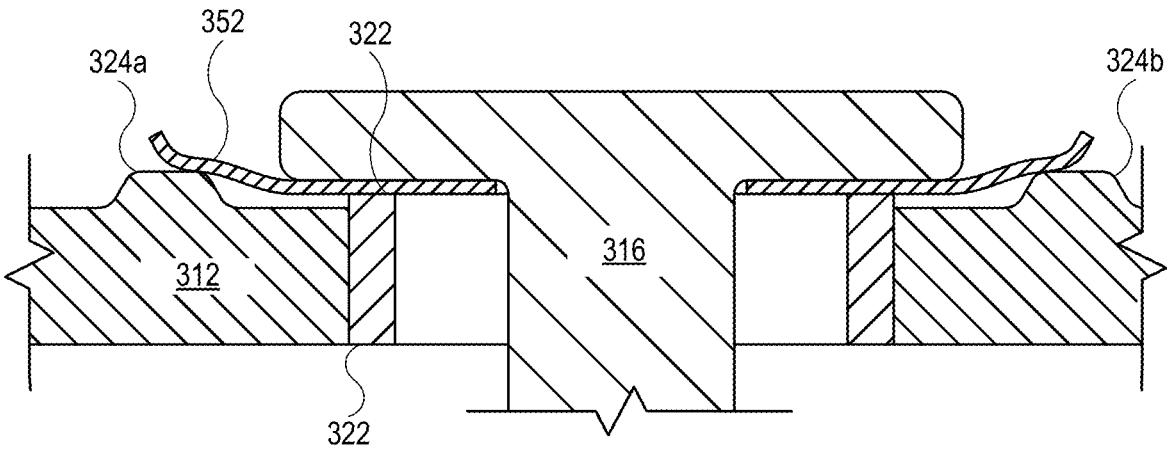
FIG. 10 illustrates a partial cross sectional view of an apparatus, showing deformation of the washer based on movement of a fastener, in accordance with one or more implementations of the present disclosure.

FIG. 10 illustrates a partial cross sectional view of an apparatus 312, showing deformation of the washer based on movement of the fastener 316, in accordance with one or more implementations of the present disclosure. As shown, a washer 352 is positioned between the fastener 316 and the ribs 324a and 324b. The washer 352 may take the form of one of the washer 340 (shown in FIG. 9A) or the washer 342 (shown in FIG. 9B). Despite having a different shape, the washer 352 may deform based on an applied torque by the fastener 316 as well as by a counterforce applied by the ribs 324a and 324b.

FIG. 11 and FIG. 12 illustrate flow diagrams showing an example processes that may be performed for integrating an apparatus, in accordance with implementations of the subject technology. For explanatory purposes, the processes are primarily described herein with reference to apparatus shown in FIGS. 3-10. However, the process is not limited to a particular apparatus, and one or more blocks (or operations) of the process may be performed by one or more other components of other suitable moveable apparatuses, devices, or systems. Further for explanatory purposes, some of the blocks of the processes are described herein as occurring in serial, or linearly. However, multiple blocks of the processes may occur in parallel. In addition, the blocks of the processes need not be performed in the order shown and/or one or more blocks of the processes need not be performed and/or can be replaced by other operations.

FIG. 11 illustrates a flow diagram showing a process 400 for forming a joint to secure components together, in accordance with one or more implementations of the present disclosure.

At block 402, a planar washer (e.g., washer 332 shown in FIG. 6) is placed in contact with at least one rib (e.g., rib 324a and/or rib 324b shown in FIG. 6) that protrudes from a skid plate (e.g., apparatus 312 shown in FIG. 6) for a vehicle (e.g., vehicle 100 shown in FIG. 1A). In one or more implementations, the at least one rib and a second rib provide support surfaces for the planar washer.

At block 404, a fastener (e.g., fastener 316) is provided through an opening in the planar washer and an opening in the skid plate. The opening may be adjacent to the at least one rib such that when the fastener is provided through the respective openings of the planar washer and the skid plate, the planar washer contacts the at least one rib.

At block 406, a force is provided on the planar washer that, in combination with an opposing force provided by the at least one rib on the planar washer, deforms the planar washer into contact with a compression limiter (e.g., compression limiter 322) disposed within the opening in the skid plate. The force may include an applied torque used to drive (e.g., rotationally drive) the fastener to secure the fastener with a nut.

FIG. 12 illustrates a flow diagram showing a process 500 for forming an apparatus, in accordance with one or more implementations of the present disclosure.

At block 502, a body is molded to form an apparatus. The apparatus may include a skid plate for a vehicle, and in particular, to protect an underside of a battery pack of the vehicle. As a non-limiting example, the molding may include compression molding a polypropylene material along with embedded fibers (e.g., glass fibers).

At block 504, an opening is formed in the body. In one or more implementations, molding the body includes molding one or more ribs that extend from a surface of the body. Further, the one or more ribs may surround the opening. The opening may be configured to receive a fastener used to secure with a battery pack enclosure and/or a vehicle body. The fastener and the one or more ribs may combine to deform a washer against a compression limiter to form a joint.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
a body comprising an opening configured to receive a compression limiter; and
one or more ribs extending from a surface of the body, wherein the one or more ribs are configured to engage a washer, and cause, in part, the washer to bend and engage the compression limiter to form a joint configured to secure the body with a battery pack enclosure.

2. The apparatus of claim 1, wherein:
the body comprises a skid plate, and
the skid plate comprises a size and shape to cover a battery pack for a vehicle and to provide damage protection for a bottom surface of the battery pack.

3. The apparatus of claim 1, wherein:
the one or more ribs comprise a first rib and a second rib, and
the opening is positioned between the first rib and the second rib.

4. The apparatus of claim 1, wherein:
the one or more ribs extend a first distance from the surface, and
the body comprises a dimension such that the compression limiter extends beyond the surface to a second distance that is less than the first distance.

5. The apparatus of claim 4, wherein:
the compression limiter comprises a steel ring, and
the first distance is 2 millimeters or less.

6. The apparatus of claim 1, wherein the one or more ribs comprise:

a first rib; and a second rib parallel with respect to the first rib.

7. The apparatus of claim 6, wherein:

the compression limiter is surrounded by the first rib and the second rib, and the first rib and the second rib engage the washer.

8. The apparatus of claim 1, wherein the body comprises glass fibers embedded in a polypropylene.

9. An apparatus, comprising:

a skid plate configured to secure to a component of a vehicle, the skid plate comprising:

a first surface, a second surface opposite the first surface, and an opening that extends from the first surface to the second surface; and one or more ribs at least partially surrounding the opening and extending a first distance from the first surface, wherein the opening is configured to receive a compression limiter that extends beyond the first surface to a second distance that is less than the first distance.

10. The apparatus of claim 9, wherein the opening is further configured to receive a fastener that secures the apparatus with the component.

11. The apparatus of claim 10, wherein the one or more ribs are configured to engage a washer, and cause, with the fastener, the washer to bend and engage the compression limiter to form a joint.

12. The apparatus of claim 11, wherein:

the component comprises a battery pack, and the fastener and the washer, deformed into engagement with the compression limiter, attach the skid plate and the battery pack to the vehicle.

13. The apparatus of claim 9, wherein:

the skid plate comprises a first dimension from the first surface to the second surface, the skid plate comprises a second dimension from the one or more ribs to the second surface, and the compression limiter comprises a third dimension that is greater than the first dimension and less than the second dimension.

14. The apparatus of claim 13, wherein:

the first surface faces away from the component, and the second surface faces the component.

15. The apparatus of claim 9, wherein the one or more ribs comprise:

a first rib on a first side of the opening; and a second rib on a second side of the opening, the second side opposite the first side.

16. The apparatus of claim 15, wherein:

the first rib is parallel with respect to the second rib, and the first rib is spaced from the second rib that allows the first rib and the second rib to engage a washer.

17. A method, comprising:

placing a planar washer in contact with at least one rib that protrudes from a skid plate for a vehicle;

providing a fastener through an opening in the planar washer and an opening in the skid plate; and providing, with the fastener, a force on the planar washer that, in combination with an opposing force provided by the at least one rib on the planar washer, deforms the planar washer into contact with a compression limiter disposed within the opening in the skid plate.

18. The method of claim 17, wherein the planar washer is deformed to form, in part, a joint that attaches the skid plate to a vehicle body of the vehicle.

19. The method of claim 17, further comprising providing the fastener through an opening in a battery pack enclosure, and an opening in a body of the vehicle.

20. The method of claim 17, wherein providing the force comprises applying a torque to the fastener.

* * * * *